(12) United States Patent
Badding et al.

(10) Patent No.: US 7,947,213 B2
(45) Date of Patent: May 24, 2011

(54) METHOD OF MAKING A TEXTURED ELECTROLYTE SHEET FOR A FUEL CELL DEVICE

(75) Inventors: Michael E. Badding, Elmira, NY (US); Jacqueline L. Brown, Lindley, NY (US); Sean M. Garner, Elmira, NY (US); Thomas D. Ketcham, Big Flats, NY (US); Dell J. St. Julien, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/824,910

(22) Filed: Jul. 3, 2007

(65) Prior Publication Data

US 2007/0273070 A1 Nov. 29, 2007

Related U.S. Application Data

(60) Division of application No. 10/700,295, filed on Nov. 3, 2003, now abandoned, which is a continuation-in-part of application No. 10/611,507, filed on Jun. 30, 2003, now Pat. No. 7,531,261.

(51) Int. Cl.
*C04B 35/64* (2006.01)
*B28B 1/14* (2006.01)
(52) U.S. Cl. ........................................ 264/618; 264/650
(58) Field of Classification Search .................. 264/650, 264/618, 636, 214
See application file for complete search history.

(56) References Cited

U.S. PATENT DOCUMENTS

| 4,135,040 | A |   | 1/1979  | Thornton ..................... 429/191 |
|-----------|---|---|---------|---------------------------------------|
| 4,710,227 | A |   | 12/1987 | Harley et al. ................. 106/193 |
| 5,002,710 | A | * | 3/1991  | Shanefield et al. ........... 264/650 |
| 5,085,455 | A |   | 2/1992  | Bogner et al. ................. 280/618 |
| 5,273,837 | A |   | 12/1993 | Aitken et al. .................. 429/30 |
| 5,306,646 | A | * | 4/1994  | Lauf .............................. 438/71 |

(Continued)

FOREIGN PATENT DOCUMENTS

EP 0302972 8/1987

(Continued)

OTHER PUBLICATIONS

Fried, Joel R. Polymer Science and Technology. Upper Saddle River, NJ, Prentice Hall Professional Technical Reference, 2003, pp. 156-157, 176-200, 285-288, 523.*

*Primary Examiner* — Matthew J Daniels
*Assistant Examiner* — Erin Snelting
(74) *Attorney, Agent, or Firm* — Svetlana Z. Short

(57) ABSTRACT

According to one aspect of the present invention the fuel cell device includes an electrolyte sheet. The electrolyte sheet has a substantially non-porous body of a varied thickness, a relatively smooth surface and a more textured surface with multiple indentations therein, wherein the thickest part of the electrolyte sheet is at least 0.5 micrometers greater than the thinnest part of said electrolyte sheet. The side of the electrolyte sheet with a relatively smooth surface is subjected to the predominately tensile force and the other, more textured surface subjected to predominately compressive force. According to one embodiment, the fuel cell also includes one cathode disposed on the more textured side of said electrolyte sheet at least at least one anode disposed opposite the cathode on the relatively smooth side of aid electrolyte sheet. According to one embodiment, the relatively smooth side of the electrolyte sheet is the fuel facing side and the more textured side is the air-facing side.

22 Claims, 11 Drawing Sheets

U.S. PATENT DOCUMENTS

| | | | | |
|---|---|---|---|---|
| 6,001,761 A | * | 12/1999 | Hata et al. | 501/103 |
| 6,428,920 B1 | | 8/2002 | Badding et al. | 429/30 |
| 2001/0044043 A1 | | 11/2001 | Badding et al. | 429/40 |
| 2002/0012825 A1 | * | 1/2002 | Sasahara et al. | 429/30 |
| 2002/0076593 A1 | * | 6/2002 | Helfinstine et al. | 429/30 |
| 2002/0102450 A1 | | 8/2002 | Badding et al. | 429/32 |
| 2002/0174935 A1 | | 11/2002 | Burdon et al. | 156/89.11 |
| 2003/0235737 A1 | * | 12/2003 | Jeon et al. | 429/30 |
| 2005/0074650 A1 | * | 4/2005 | Sridhar et al. | 429/30 |
| 2007/0134532 A1 | * | 6/2007 | Jacobson et al. | 429/32 |

FOREIGN PATENT DOCUMENTS

| | | |
|---|---|---|
| EP | 0317676 | 11/1987 |
| JP | 59091016 A * | 5/1984 |

* cited by examiner

METHOD OF MAKING A TEXTURED ELECTROLYTE SHEET FOR A FUEL CELL DEVICE

CROSS-REFERENCE TO RELATED APPLICATIONS

This application is a divisional of U.S. patent application Ser. No. 10/700,295 filed on Nov. 3, 2003 now abandoned, which is a continuation-in-part of U.S. patent application Ser. No. 10/611,507 filed on Jun. 30, 2003 now U. S. Pat. No. 7,531,261, the contents of which is relied upon and incorporated herein by reference in its entirety, and the benefit of priority under 35 U.S.C. §120 is hereby claimed.

BACKGROUND OF THE INVENTION

1. Field of the Invention

The present invention relates generally to inorganic electrolyte sheets suitable for use in fuel cells and, more particularly to textured electrolyte sheets suitable for use in solid oxide fuel cells.

2. Technical Background

U.S. Pat. No. 4,135,040 describes the use of textured electrolyte to increase ion-conductive surface area. The patent specifies that this electrolyte is suitable for use in sodium-sulfur, sodium-halogen, lithium anode type cells and solid state cells. These types of galvanic "battery" cells utilize solid state electrolytes which conduct positive ions, such as sodium or lithium, which are very mobile at low temperatures. Such electrolytes are typically fairly thick (over 200 micrometers), to maintain good mechanical integrity. This patent does not disclose solid oxide fuel cells, does not describe the thickness of the electrolyte, nor the dimensions of the features on the textured surfaces.

The use of electrolyte materials for solid oxide fuel cells has been the subject of considerable amount of research in recent years. The typical components of a solid oxide fuel cell comprise a negatively-charged oxygen-ion conducting electrolyte sandwiched between two electrodes. Electrical current is generated in such cells by oxidation, at the anode, of a fuel material, for example hydrogen, which reacts with oxygen ions conducted through the electrolyte. Oxygen ions are formed by reduction of molecular oxygen at the cathode.

U.S. Pat. No. 5,085,455 discloses thin, smooth inorganic sintered sheets. The disclosed sintered sheets have strength and flexibility to permit bending without breaking as well as excellent stability over a wide range of temperatures. Some of the disclosed compositions, such as yttria stabilized zirconia YSZ ($Y_2O_3$—$ZrO_2$) would be useful as electrolytes for fuel cells. It is known that at sufficient temperatures (e.g., about 725° C. and above), zirconia electrolytes exhibit good ionic conductance and very low electronic conductance. U.S. Pat. No. 5,273,837 describes the use of such compositions to form thermal shock resistant solid oxide fuel cells.

US Patent Publication US2002/0102450 describes solid electrolyte fuel cells which include an improved electrode-electrolyte structure. This structure comprises a solid electrolyte sheet incorporating a plurality of positive and negative electrodes, bonded to opposite sides of a thin flexible inorganic electrolyte sheet. One example illustrates that the electrodes do not form continuous layers on electrolyte sheets, but instead define multiple discrete regions or bands. These regions are electronically connected, by means of electrical conductors in contact therewith that extend through vias in electrolyte sheet. The vias are filled with electronically conductive materials.

US Patent Publication US2001/0044043 describes solid electrolyte fuel cells utilizing substantially planar, smooth electrolyte sheet with a roughened interface surface layer. This publication discloses electrolyte sheet thickness below 45 micrometers. The ceramic electrolyte sheet is flexible at such thicknesses.

U.S. Pat. No. 6,428,920 describes a porous nanocrystalline interface roughened layer placed on top of and sintered to the smooth electrolyte sheet (substrate). The porous nano-crystalline roughening layer has a randomly structured surface with submicron surface features (grain size below 1 micron and preferably below 0.5 micrometers) and characterized by the arithmetic average surface roughness of about 0.2 micrometers.

Electrical conductance of the electrolyte is proportional to its material conductance times its thickness. That is, the electrolyte's ohmic resistance depends on material properties of the electrolyte and is proportional to the thickness of the electrolyte. Thus, in order to reduce ohmic resistance and to improve electrical conductance, electrolyte thickness must be as thin as possible. However, reduction in electrolyte thickness results in physical weakening of the electrolyte. For example, a ceramic electrolyte sheet having a thickness below 10 micrometers often breaks during handling or processing making process yields relatively low. In addition, a defect in an electrolyte sheet may necessitate a replacement of entire electrolyte structure.

SUMMARY OF THE INVENTION

According to one aspect of the present invention the fuel cell device includes an electrolyte sheet. The electrolyte sheet has a substantially non-porous body of a varied thickness, a relatively smooth surface and a more textured surface with multiple indentations therein, wherein the thickest part of the electrolyte sheet is at least 0.5 micrometers greater than the thinnest part of said electrolyte sheet. The side of the electrolyte sheet with a relatively smooth surface is subjected to the predominately tensile force and the other, more textured surface subjected to predominately compressive force.

According to one embodiment the electrolyte sheet has a substantially non-porous body of a varied thickness, a relatively smooth surface and a more textured surface with multiple indentations therein, wherein the thickest part of the electrolyte sheet is at least 0.5 micrometers greater than the thinnest part of said electrolyte sheet, wherein the relatively smooth side is the fuel facing side and said more textured side is the air-facing side.

According to one embodiment, the fuel cell also includes one cathode disposed on the more textured side of said electrolyte sheet at least at least one anode disposed opposite the cathode on the relatively smooth side of said electrolyte sheet. According to one embodiment, the relatively smooth side of the electrolyte sheet is the fuel facing side and the more textured side is the air-facing side. According to one embodiment the electrolyte sheet includes thicker and thinner areas and the thinner areas become progressively thinner closer to the edges.

According to one embodiment of the present invention the thickest part of the electrolyte sheet is at least 2 micrometers greater than the thinnest part of the electrolyte sheet. According to this embodiment the electrolyte sheet has an average thickness greater than 5 micrometers and less than 100 micrometers. It is preferable that the average thickness be below 45 micrometers and most preferable that the average thickness is below 20 micrometers.

According to one embodiment, a method of making an electrolyte sheet comprises the steps of: (a) providing a green slip on a carrier, said slip containing a relatively volatile material; (b) spreading said slip upon said carrier to form a green sheet; (c) at least partially evaporating said volatile material; (d) embossing said green sheet with at least 0.5 micrometer variations in its thickness thereby providing textured, green sheet; (e) sintering the textured, green sheet to provide an electrolyte sheet with substantially non-porous body, the non porous body having a textured surface with multiple indentations therein, wherein the thickest part of the electrolyte sheet is at least 0.5 micrometers greater than the thinnest part of the electrolyte sheet.

According to another embodiment a method of making an electrolyte sheet comprises the steps of: (a) providing a green slip on a patterned carrier with at least 0.5 micrometer surface variations, said slip containing a relatively volatile material; (b) spreading said slip on the patterned carrier to form a textured green sheet having at least one textured surface; (c) at least partially evaporating said volatile material; and (d) sintering the textured green sheet to provide an electrolyte sheet with substantially non-porous body, the non porous body having a textured surface with multiple indentations therein, wherein the thickest part of the electrolyte sheet is at least 0.5 micrometers greater than the thinnest part of the electrolyte sheet.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
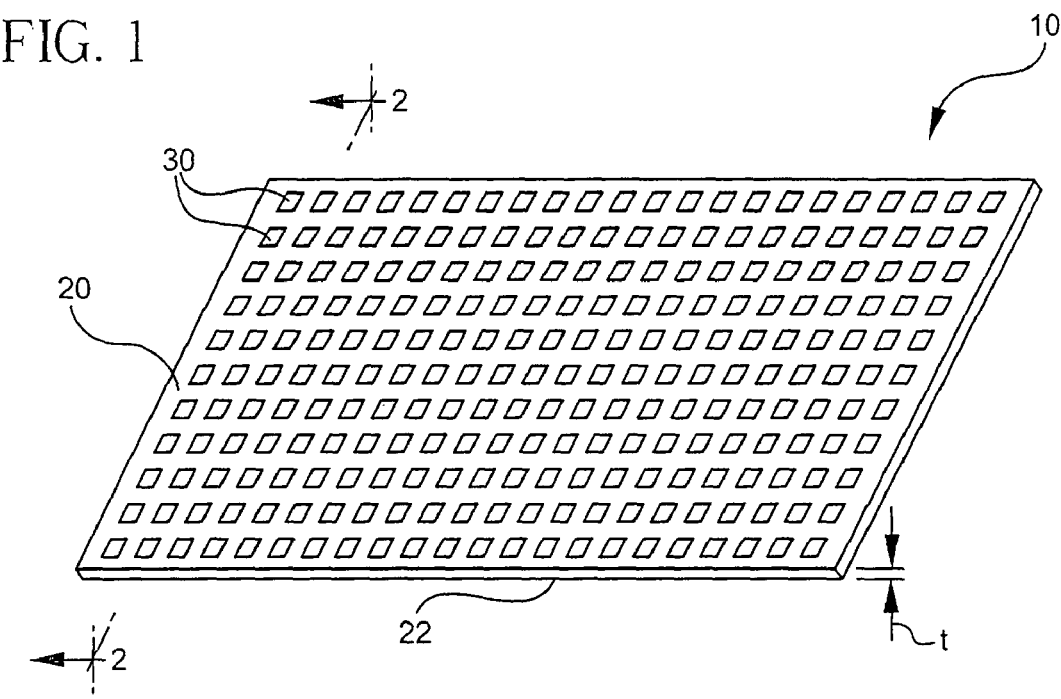
FIG. 1 is a schematic illustration of an exemplary electrolyte sheet of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. One exemplary embodiment of the inorganic electrolyte sheet of the present invention is shown in FIG. 1, and is designated generally throughout by the reference numeral 10. The electrolyte sheet 10 is a thin ceramic sheet, with two opposite major surfaces 20, 22 and an average thickness t. At least one of these surfaces, for example surface 20, is textured. The surface 20 of the electrolyte sheet 10 of FIG. 1 includes multiple features 25 or indentations 30. It is preferable that the indentations 30 be periodically arranged on the surface of the electrolyte sheet. However, the indentations may also be in a non-periodic arrangement.

Figure 2:
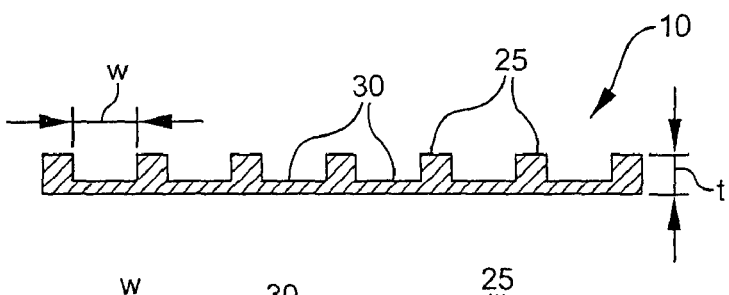
FIG. 2 illustrates a cross sectional view of the electrolyte sheet of FIG. 1.
Figure 3:
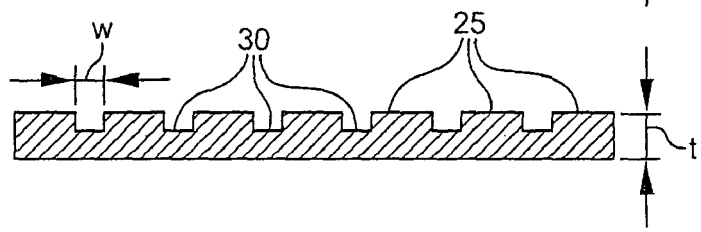
FIG. 3 illustrates schematically alternative spacings of the indentations of the electrolyte sheet of FIG. 1.
Figure 4A:
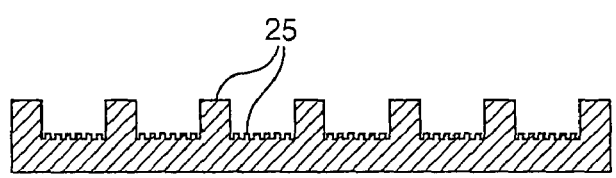
FIGS. 4A and 4B illustrate schematically that the indentations on the surface of the electrolyte sheet may also be textured.
Figure 4B:
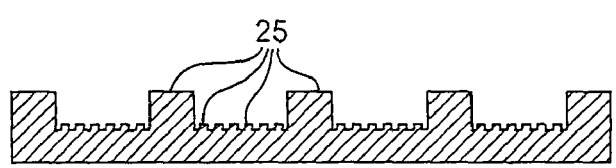

A cross-section of a portion of the electrolyte sheet 10 is illustrated schematically in FIG. 2. The features 25 of the textured surface 20 may have different shapes, as showing, for example in FIG. 3. It is preferable that the height of the features is at larger than 0.3 micrometers. It is even more preferable that the height of the features be in the range of 0.5 to 50 micrometers The indentations 30 may be wider than they are deep and may be spaced apart by distances greater than their width W (or greatest dimension). Alternatively, the indentations 30 may be spaced apart by distances equal to or smaller than their widths. This is shown schematically, for example, in FIG. 3. The indentations may also be micro-textured as shown in FIGS. 4A and 4B. For example, indentations 30 may have an average depth and width of 5 micrometers. These indentations 30 may include grooves or other structure (for example, 0.5 micrometers deep) on their bottom surfaces.

The indentations 30 reduce the average thickness t of the electrolyte sheet 10, therefore reducing its ohmic resistance and increasing its ionic conductance, without significantly reducing the mechanical properties of the electrolyte sheet. This decrease in ohmic resistance and the increase in ionic conductance advantageously enables the electrolyte sheet 10 to operate at relatively low temperatures (i.e., below 725° C.). Thus, one may choose to utilize the electrolyte sheet of the present invention in the temperature ranges of 600° C. to 725° C., as well as in the conventional temperature ranges of 725° C. to 850° C.

It is preferred that the electrolyte sheet be thin enough so that the electrolyte's ohmic resistance be less than about 0.5 ohm/cm$^2$ and more preferably less than 0.2 ohm/cm$^2$. In addition, the indentations or surface texturing also advantageously increases surface area of the electrolyte sheet, thus increasing ionic conductance. Thus, in order to decrease ohmic resistance and to increase ionic conductance of the electrolyte sheet 10 both sides 20, 22 may be textured.

The electrolyte sheet 10 is has a substantially non-porous (i.e., substantially without closed pores, porosity being less than 5%) body and the thickest part the electrolyte sheet 10 is at least 0.5 micrometers greater than the thinnest part of the electrolyte sheet. It is preferable that porosity is less than 3% and more preferable that porosity is less than 1%. It is also preferable that the difference Δt between the thinnest and the thickest part of the electrolyte sheet 10 be between 0.5 micrometers and 90% of the average thickness t, or even more preferable between 1 micrometer 40 micrometers, and most preferable that it be between 1 micrometer and 20 micrometers. It is even more preferable that this thickness difference Δt be between 2 micrometers 15 micrometers. It is most preferable that this thickness difference be 3 to 10 micrometers. The electrolyte sheet 10 preferably has an average thickness t that is greater than 4 micrometers and less than 100 micrometers, preferably less than 45 micrometers, more preferably between 4 micrometers and 30 micrometers, and most preferably between 5 micrometers and 18 micrometers. Lower average thickness is also possible. The lower limit of thickness is simply the minimum thickness required to render the structure amenable to handling without breakage. It is preferable that the thin areas of the electrolyte sheet be less than 20 micrometers thin, preferably less than 15 micrometers thin and more preferably less than 10 micrometers thin. It is preferable that the electrolyte sheet body is a monolithic body (i.e., a body produced as one piece instead of multiple layers of different porosity that have been sintered together).

The thin, textured electrolyte sheets such as those described above can be advantageously utilized in the manufacture of solid oxide fuel cells. Thus, according to one embodiment of the present invention a solid oxide electrode/electrolyte assembly 50 of a fuel cell comprises: (a) a thin ceramic electrolyte sheet 10 of varied thickness, with an average thickness between 3 micrometers and 30 micrometers; (b) at least one cathode 52 disposed on a first surface 20 of the electrolyte sheet 10; and (c) at least one anode 54 disposed opposite the cathode 52, on a second surface 22 of the electrolyte sheet 10; wherein the electrolyte sheet 10 has a thickness variation of at least 2 micrometers. Such an assembly is illustrated in FIGS. 5A and 5B.

Figure 5A:
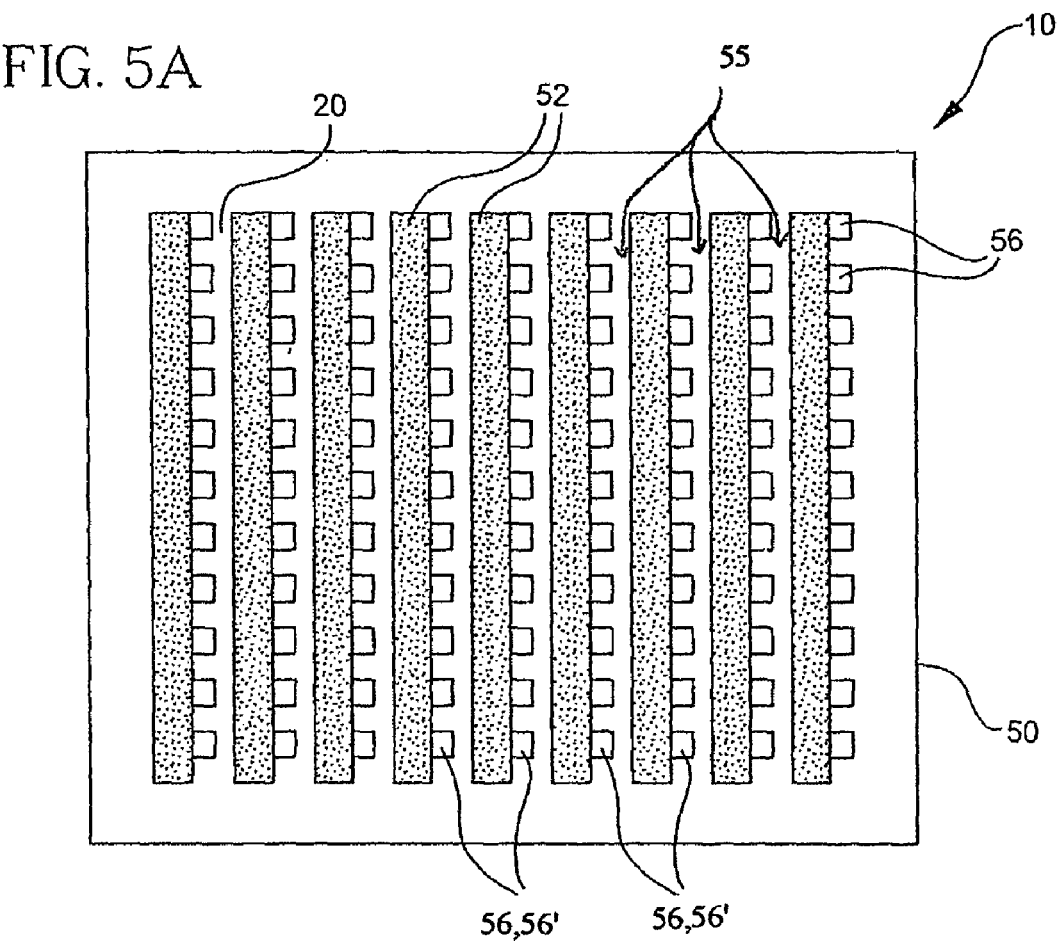
FIGS. 5A and 5B illustrate an electrode-electrolyte assembly with eight cells connected in series through the interconnect vias.
Figure 5B:
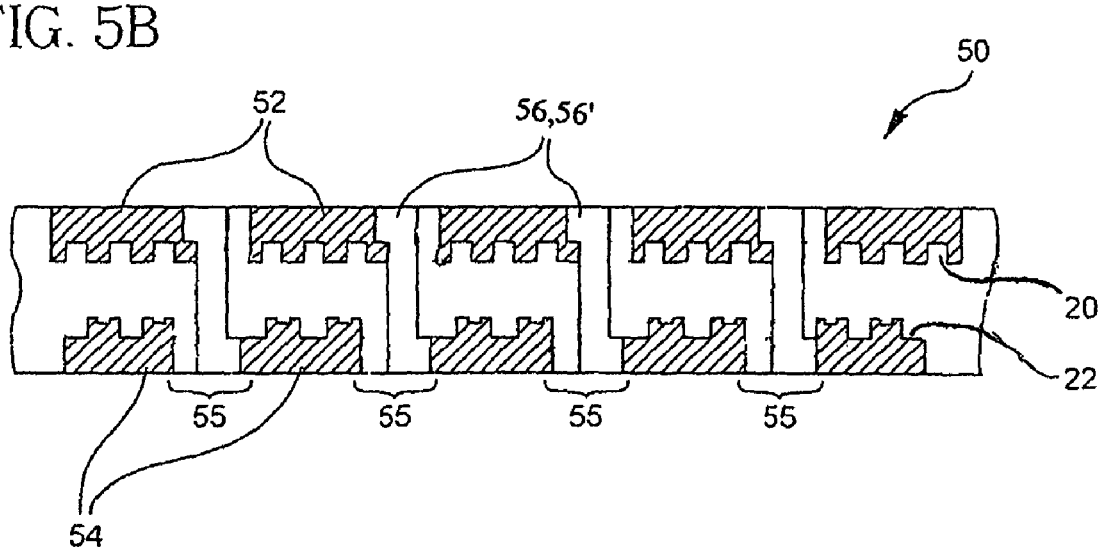

More particularly, FIGS. 5A and 5B show two views of self supporting zirconia-3 mole % yttria electrolyte sheet 10 supporting electrodes 52, 54 in the form of rectangular segments connected through small vias (holes) 56 in the electrolyte sheet 10. The top plane of the electrode-electrolyte assembly is shown in FIG. 5A. FIG. 5B is a schematic elevational cross sectional view of a five-cell section of the electrode-electrolyte assembly shown in FIG. 5A. According to this embodiment the electrode/electrolyte assembly 50 includes a plurality of anode-cathode pairs 52, 54. The anode-cathode pairs 52, 54 are separated from one another by via galleries 55. The via galleries 55 include a plurality of interconnects (called "via interconnects") 56' situated in the vias 56. These interconnects 56' conduct electronic current from the anode of one cell to the cathode of an adjacent cell. It is preferable that the body of the electrolyte sheet 10 which is located under the electrodes (anode(s) and cathode(s)) is relatively thin. That is, it is preferable that of 50% and more preferably 75% of the area under the electrodes be thinned. This design is notable for the absence of expensive interconnect plates.

Thin electrolyte sheets can be formed in the green state in a molded configuration and subsequently sintered to form an electrolyte sheet with a large measure of flexibility. Preparation of green (unfired) material is known in the art and is described, for example in U.S. Pat. No. 4,710,227. More specifically, this patent discloses the preparation of thin flexible "green" (unfired) tapes from solutions, the tapes being coated and cut, stacked and fired to form thin-dielectric capacitors. This type of process is further described in published European applications EP 0302972 and EP 0317676. Thus, in order to manufacture a thin, textured, electrolyte of the present invention a thin textured sheet or layer comprising the green pre-sintered material, is first produced. The green pre-sintered material is then sintered to provide a textured, sintered ceramic sheet with a flexibility sufficient to permit a high degree of bending without breakage under an applied force. Flexibility in the sintered ceramic sheets is sufficient to permit bending to an effective radius of curvature of less than 20 centimeters or some equivalent measure, preferably less than 5 centimeters or some equivalent measure, more preferably less than 1 centimeter or some equivalent measure.

By an "effective" radius of curvature is meant that radius of curvature which may be locally generated by bending in a sintered body in addition to any natural or inherent curvature provided in the sintered configuration of the material. Thus, the resultant curved sintered ceramic electrolyte sheets can be further bent, straightened, or bent to reverse curvature without breakage.

The flexibility of the electrolyte sheet will depend, to a large measure, on layer thickness and, therefore, can be tailored as such for a specific use. Generally, the thicker the electrolyte sheet the less flexible it becomes. Thin electrolyte sheets are flexible to the point where toughened and hardened sintered ceramic electrolyte sheet may bend without breaking to the bent radius of less than 10 mm. Such flexibility is advantageous when the electrolyte sheet is used in conjunction with electrodes and/or frames that have dis-similar coefficients of thermal expansion and/or thermal masses.

The texturing of one or both surfaces 20, 22 can be accomplished in various manners prior to sintering of the electrolyte sheet. For example, textured electrolyte sheets can be produced by providing a green (i.e., un-sintered) sheet of solid, negative ion-conducting (e.g., $O_2^-$) material (for example, zirconia-3 mole % yttria, referred to herein as 3YSZ), texturing at least one face of this green sheet and then sintering the textured green sheet to provide a solid ion conductive electrolyte sheet with thickness variations from 0.5 micrometers to 40 micrometers. It is preferable that the sintering is done at temperatures above 1000° C., more preferably above 1300° C., for about 1-3 hours. For example, a method of making a textured electrolyte sheet includes the steps of: (a) providing a green sheet; (b) texturing the green sheet such that it has varied thickness to provide at least 0.5 micrometer variations in its thickness; (c) sintering the textured, green sheet to provide an electrolyte sheet with a substantially non-porous body, the non porous body having a textured surface with multiple indentations therein, wherein the thickest part of the electrolyte sheet is at least 0.5 micrometers greater than the thinnest part of the electrolyte sheet. It is preferable that the green sheet and the resulting electrolyte sheet has a thickness variation of at least 2 micrometers.

Figure 6A:
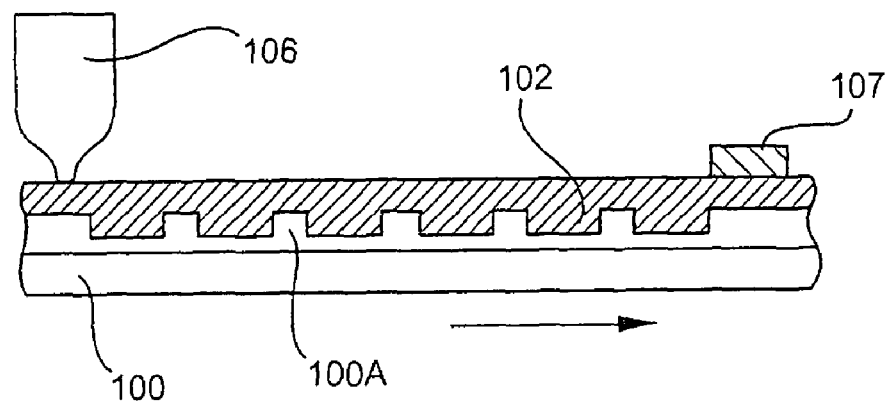
FIGS. 6A and 6B illustrate schematically two different ways of making a textured green sheet utilizing a textured or patterned surface.

There are several methods of producing the desired surface texturing in a flexible ceramic. One method involves tape casting or web coating over a patterned substrate carrier 100. The substrate carrier 100 can be patterned, for example, by two methods. One, is to have a moving substrate carrier (for example, Mylar®, a continuous belt of steel, Teflon®, a Teflon® coated fabric, polyethylene) embossed with the reverse pattern 100A of the desired indentations, before tape casting or web coating the green material 102 (also referred to as slip) on the substrate carrier. This is illustrated schematically in FIG. 6A. For example, applicants were able to successfully emboss 1.5 µm deep features onto a 125 µm Teflon® substrate carrier by applying 100 psi at 160° C. with a static press for dwell time of about 1 minute. The slip was then cast on the embossed carrier using a doctor blade, forming a green sheet. When dried, the resultant green sheet 103 successfully retains the desired pattern. Smaller features on the electrolyte surface have been also produced by this method.

Figure 6B:
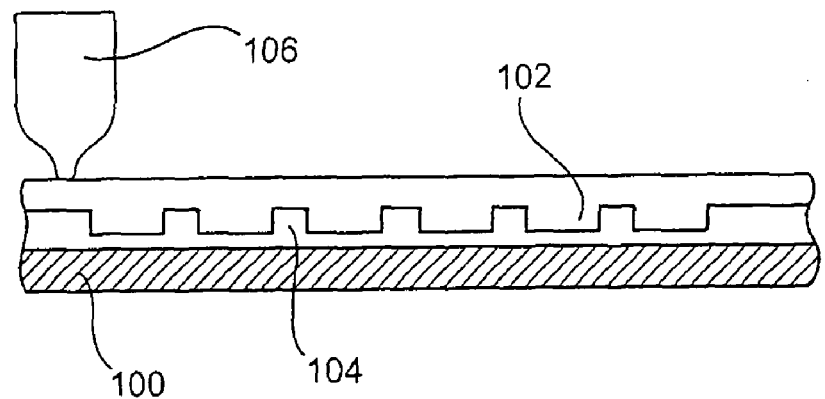

Another texturing method is to use a second layer 104 (for example, a polymer layer) on a flat substrate carrier (also referred to as base substrate herein) and patterning the second layer 104 instead of the flat base substrate 100. This is shown schematically in FIG. 6B. If the layer 104 is made of polymer, this polymer may be, for example, polymethyl methacrylate in a solution of ethyl acetate. When the solvent dries the polymer becomes a pliable solid material which is easy to pattern. The polymer layer 104 is then patterned, either by embossing (for example, by embossed roller or platen) or by stripping selected areas of the polymer from the substrate carrier 100 (i.e., the base substrate), leaving a pattern of the fugitive polymer. The high spots in the polymer pattern would correspond to the thin areas of the electrolyte sheet 10. If the second layer, i.e., layer 104 is embossed, it is preferable that embossing is done at temperatures between 30° C. and 170° C. This is because the Tg temperature (i.e., the softening temperature of the polymer sheet, or the second layer 104 (immediate carrier)) is likely to be in this range, and softening of the second layer 104 can make the embossing of this second layer 104 easier. For example, if the second layer 104 is PMMA (poly methyl methacrylate), this material's Tg will be about 110° C. If the second layer 104 is poly butyl methacrylate, this material's Tg will be about 30° C.

The texturing of the electrolyte sheet may be achieved, for example, by molding or embossing the green sheet, when the green sheet is placed in a suitable mold or die (preferably with periodic depressions) to form desired surface indentations. Alternatively, sufficiently thin ceramic sheets can be also reformed through a process of superplastic deformation at high temperatures below their melting points. However, more effective and economic electrolyte sheet patterning can be achieved through the process of reshaping unfired green sheet at above room temperature (20° C.) and below 200° C., prior to sintering. For, example, the green sheet may also be patterned at a temperatures of 25° C., 30° C., 40° C., 50° C., 60° C., 70° C., 80° C., 90° C., 100° C., 110° C., 125° C., 150° C. or 200° C. The preferred temperature range is 50° C. to 100° C. More specifically, it is preferred that the green sheet be patterned at a temperature that is below Tg temperature of its immediate carrier (i.e., the layer directly under the green sheet). More specifically, embossing would ideally occur at a temperature where the green sheet's elastic modulus is lower than the immediate carrier's 100 or 104 elastic modulus. In this case, the softer green sheet will be deformed more than the immediate carrier (100 or 104). The embossing pressure is preferably 150 psi or less, preferably 70-100 psi. Other pressures may also be utilized.

Figure 7:
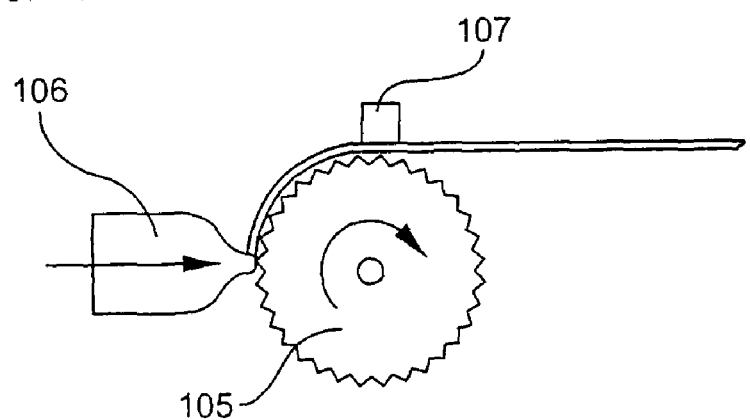
FIG. 7 illustrates schematically a method of making a textured green sheet utilizing a textured or patterned roller.

Another approach is to web coat or tape cast onto a uniform substrate carrier 100 that is drawn over a textured roller 105. This is shown schematically in FIG. 7. The coating die 106 dispenses the green slip 102 which forms a film when the slip 102 comes into contact with the moving substrate carrier 100. When web coating is utilized, the coating die 106 dispensing the green slip 102 will be typically far enough (greater than 25 micrometers and preferably greater than 50 micrometers) off the substrate carrier 100 that the green coating may not fully reflect the underlying texture of the roller. A tape casting "doctor blade" 107 may be (optionally) placed 1 to 30 cm downstream from the web coating die 106, and with proper clearance (less than 50 micrometers and preferably 10 to 25 micrometers), it can remove the green material 102 from the higher areas of the green sheet, thus producing the desired thinner areas in the now textured green sheet 103. The green slip contains a relatively large amount of volatile liquid material (20-65 wt % and preferably 30-40 wt %) that boil below 250° C. The volatile liquid material may include at least one solvent and/or at least one plasticizer. An example of such material is butanol, ethanol, ethyl acetate. Other materials may also be utilized. The volatile material is at least partially evaporated from the green sheet either by air flow or heat. It is preferable to emboss the green sheet while it contains 10% to 50% of the initial volatile material. For example, if initially the green slip contained 30 wt % of volatile liquid material, after partial evaporation the green sheet may contain only 10% of this material, or 3 wt %. These volatile liquid materials will be described in more detail further in the specification.

Figure 8A:
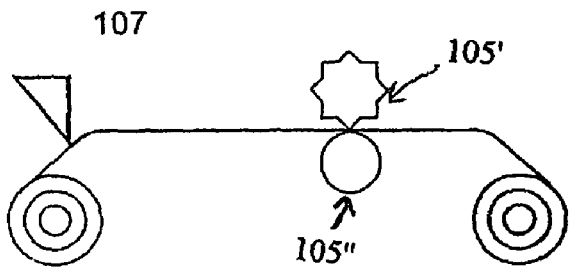
FIG. 8A illustrates schematically a device for making a textured green sheet utilizing two rollers.
Figure 8B:
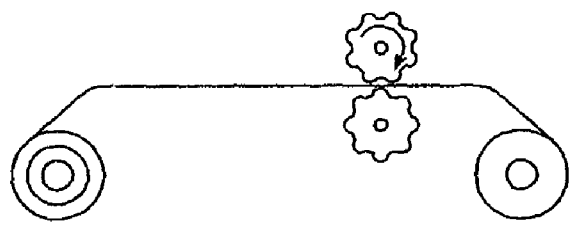
FIG. 8B illustrates schematically a device for corrugating making a textured green sheet utilizing two rollers.

An alternative method is to run a cast, but unfired, green sheet through embossing rollers 105', 105". A typical roller diameter may be 10 cm to 20 cm. At least one of these rollers 105', 105" is patterned. This is illustrated schematically in FIG. 8. More specifically, the green slip 102 is cast onto the carrier substrate 100. The carrier substrate 100 may have a smooth surface, which would initially result in a smooth green sheet. A predetermined amount of the volatile material (initially present in the green slip) will be evaporated, preferably leaving some residual volatile material in the green sheet. The high areas of the rollers 105', 105" will squeeze the green sheet, thinning some areas. The applied pressure is 5 psi to 110 psi and preferably 70 psi to 100 psi. The rollers 105', 105" are maintained at a temperature of 20° C. to 125° C., preferably 30° C. to 100° C. and more preferably 50° C. to 100° C. Temperatures of below 100° C. are preferred in order to utilize low cost water heating. Higher temperatures using other heating elements can also be utilized. The higher temperatures improve embossing capability because heated green sheet softens or has a lower viscosity during embossing. The textured green sheet 103 is then wound upon the take-up roller 108. When working with green (i.e., unfired) sheets of 15 to 30 micrometers thick, it is preferable to have the green sheet run through the two rollers 105', 105" while it is supported on a substrate carrier that is as thick or thicker than the green sheet. It is noted that in order to emboss both sides of the green sheet, two patterned rollers may be utilized. These rollers may have different patterns and the patterns may be either aligned or not aligned with one another. The green sheet may be also placed between two polymer carrier sheets during embossing. However, in this case the thickness of the carrier is relatively thin, i.e. about the same or thinner than that of the green sheet Alternatively, embossing of the green sheet may be done by removing the green sheet from the carrier and running the green sheet, without the carrier, through the embossing mechanism (for example, rollers 105', 105").

If a corrugated electrolyte sheet is desired, the corrugation pattern (non-planar features that are greater than the thickness of the green/electrolyte sheet) may also be achieved by moving the green sheet and its carrier between two patterned rollers (preferably heated 30° C.-100° C., and more preferably 50° C. to 100° C.), instead of using one smooth roller and one patterned roller. To produce corrugation, the two patterned rollers should have matching patterns such that the protrusions on one roller will correspond to indentations on the other roller and the green material will be bent according to the patterns. A green sheet that has been textured may be sent through the corrugation rollers to produce a textured corrugated green sheet. Furthermore, as mentioned above, the green sheet may be fed through the rollers 105', 105", without feeding the carrier sheet through the rollers as well.

It is preferable that green sheet will not be bound too strongly to its carrier, otherwise, when the drying is complete, the green sheet will be difficult to separate from its carrier. However, certain degree of adhesion is desired, or the patterned roller 105' may cause delaminating while embossing. An exemplary material suitable for the rollers is Teflon®. Other materials may also be utilized. Rollers coated with a release agent such as methyl cellulose, oil, or wax may also be utilized. Different types of wax and oils may be utilized, for example, parapheric, long chain alcohols (C-14 or longer), non-crystalline, crystalline, micro-crystalline and saturated or unsaturated acids such as oleic or steric acids.

Also, the carrier and/or roller(s) should be rigid enough to allow embossing of the green sheet under pressure. If it is too soft, the patterned tool may emboss features into the carrier instead of the green sheet. Thus, if the embossing of the carrier along with the green sheet is not desired, it is preferred that Tg of the green sheet be lower than the Tg of the carrier. It is preferred that the elastic modulus or viscosity of the green sheet be lower than that of the carrier.

Figure 10A:
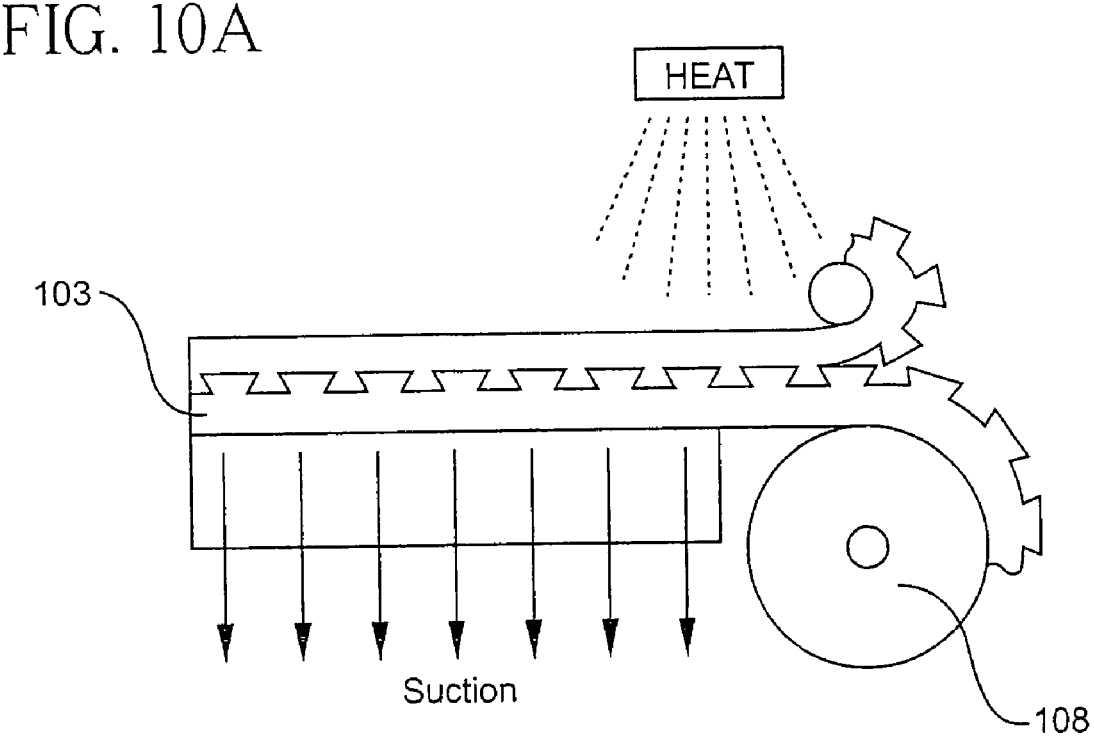
FIG. 10A illustrates schematically one mechanism for separating a textured green sheet from its carrier.

Finally, in order to separate (release) the textured green sheet 103 from its carrier 100 and/or 104, one may utilize one of the two following approaches. The carrier may be heated, for example to 50° C. or higher, preferably to 75° C. or above, and more preferably to about 100° C. while utilizing a vacuum table method disclosed, for example, in US patent Application number 20020174935. The heated Teflon carrier tends to delaminate from the textured green sheet 103 (due to mismatch of the Coefficients of Thermal Expansion, CTE and/or internal stresses of the carrier), releasing the textured green sheet 103 from the carrier. More specifically, a method for separating a green sheet 103 from its carrier may include the steps of: (a) placing the green sheet and its carrier on a vacuum table such that the green sheet is situated adjacent to said vacuum table; (b) applying enough suction force to the green sheet to keep the green sheet on the table; (c) heating the carrier to a temperature above 30° C. (and preferably to 50° C. to 150° C.); and (d) lifting the carrier from the green sheet, thus, separating the green electrolyte sheet from the carrier. This is shown, schematically on FIG. 10A. This approach is especially useful when the green sheet 103 has a textured surface such that the projecting features 25 on the textured surface of the green sheet are wider on top than at the base or do not have the 90° walls, or have undercut features, because the regular vacuum assisted release method does not work as well with green sheet having such features.

Figure 9A:
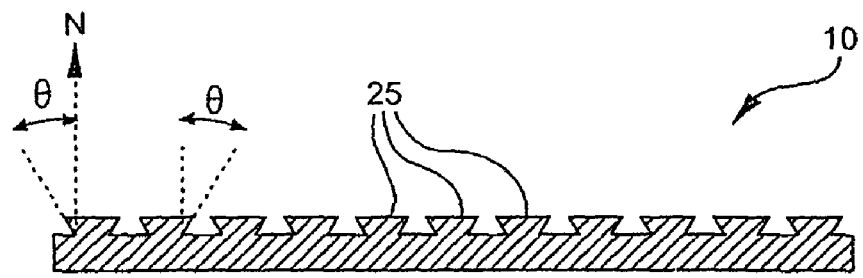
FIGS. 9A-9C are schematic illustrations of exemplary electrolyte sheets with differently textured surfaces.
Figure 9B:
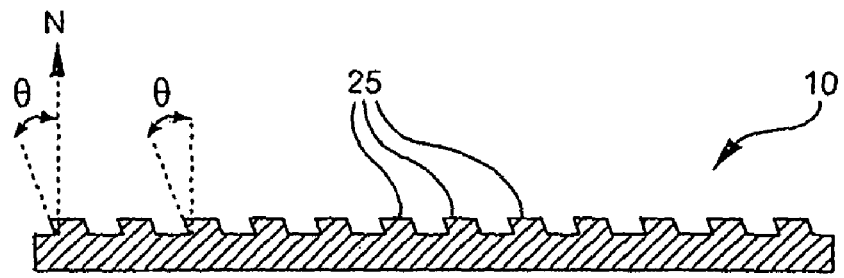
Figure 9C:
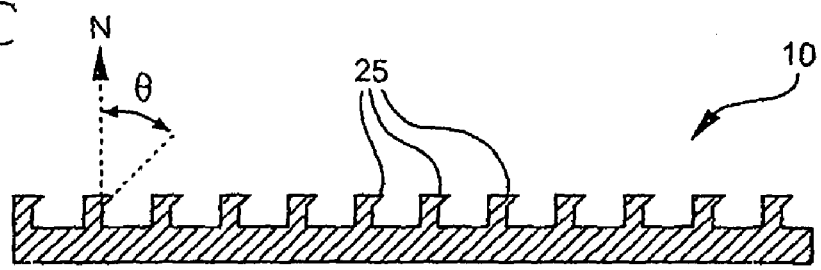

An electrolyte sheet with such features is illustrated schematically in FIGS. 9 A-C. As seen in FIGS. 9A-9C, the protruding features 25 form undercut angles θ with respect to the normal N of the green sheet. Thus, if one surface of the green electrolyte sheet 103 includes multiple protruding features 25 with undercut angles which are coupled to complimentary features in the carrier 100 or 104, the step of lifting the green sheet away from its carrier unzips the protruding features 25 from the complimentary features of the carrier.

Figure 10B:
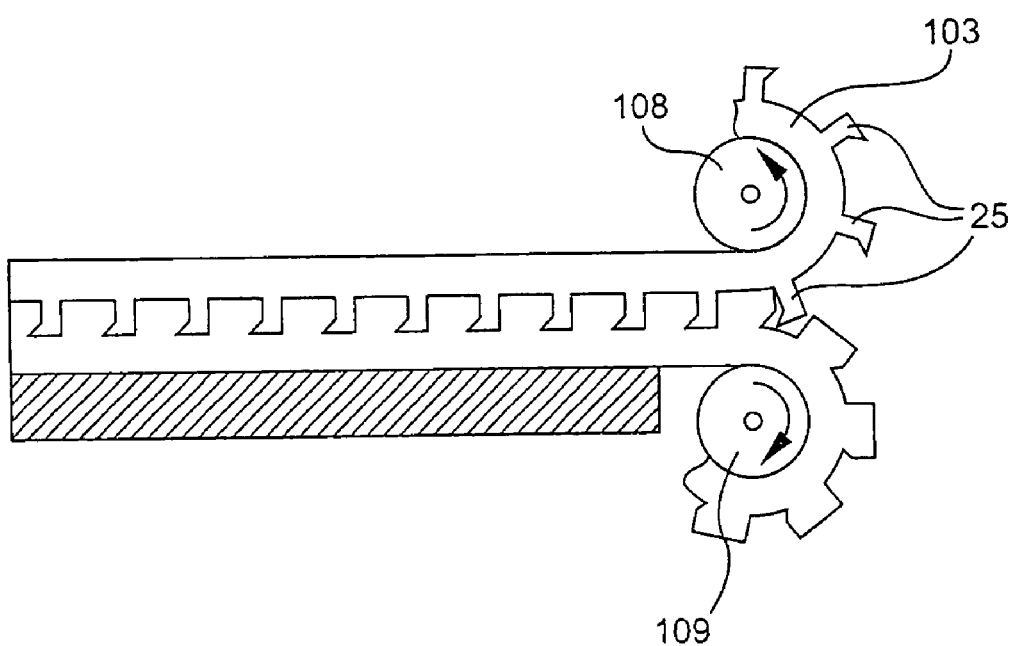
FIG. 10B illustrates schematically another mechanism for separating a textured green sheet from its carrier.

The alternative approach is to release the textured green sheet from the carrier by using two rollers 108, 109 is shown schematically in FIG. 10B. Roller 108 is the take-up roller for the textured green sheet and is utilized to pull and roll the textured green sheet 103. Roller 109 is a carrier roller and is utilized to pull and roll the carrier 100 and/or 104. This approach is especially useful when the textured green sheet has surface features 25 with undercut angles. The roller 108 simply pulls the undercut features 25 out of the interlocking carrier and "un-zips" the green sheet from its carrier.

More specifically, FIG. 10B illustrates a device for separating a green sheet 103 from its carrier which includes: (a) a first roller, the first roller pulling the textures green sheet 103 from the carrier; and (b) a second roller displaced by a predetermined distance from the first roller, the second roller being a take take-up roller for the carrier. In this embodiment, the first roller is a take-up roller for the green sheet 103. The green sheet 103 has a textured surface facing the carrier. The textured surface of the green sheet 103 has projecting features 25 that interlocks with complementary features of the carrier. The first and said second rollers, together, provide enough force to separate said projecting features of the green sheet 103 from the complementary features of the carrier. The device of FIG. 10 also includes at list one optional strip. This strip is located proximate to the side of the carrier, and, in conjunction with the rollers provides appropriate angular separation (20 to 90 degrees) between the green sheet 103 and its carrier. Alternatively, an additional roller may be utilized to provide appropriate angular separation between the green sheet 103 and its carrier. Therefore, a method for separating a green electrolyte sheet from its carrier may comprise the steps of:

(a) securing a first portion of the green electrolyte sheet to a first take up roller;

(b) securing a second portion of the carrier to a second take up roller;

(c) transferring the green electrolyte sheet and the carrier toward the first and the second take up rollers;

(d) turning the first roller at to provide enough tension to the green sheet to separate the green sheet from its carrier; and (e) turning the second roller to at least partially roll up the carrier.

Other methods may also be utilized to separate the green sheet from its carrier. It is preferable that the undercut angle θ be less than 15°. It is more preferable preferably that the under cut angle be 10° or less. Alternatively the angle θ may be larger if the carrier is simply burnt during the sintering step.

It is noted having an electrolyte sheet with a textured surface having features shown in FIGS. 9 A-C is advantageous because when electrodes are applied to the electrolyte sheet, the electrode material will adhere to the electrolyte sheet and the above mentioned features of the electrolyte sheet will make it less likely that the electrodes will separate or delaminate from the electrolyte sheet during the operation of the fuel cell device (heat cycling).

Therefore, according to one embodiment of the present invention a method of making an electrolyte sheet comprises the steps of: (a) providing a green slip on a carrier, the slip containing a relatively liquid volatile material; (b) spreading the slip upon the carrier to form a green sheet; (c) at least partially evaporating the liquid volatile material; (d) embossing the green sheet with at least 0.5 micrometer variations in its thickness thereby providing textured, green sheet; (d) sintering the textured green sheet to provide an electrolyte sheet with substantially non-porous body, the non porous body having a textured surface with multiple indentations therein, wherein the thickest part of the electrolyte sheet is at least 0.5 micrometers greater than the thinnest part of the electrolyte sheet. For example, the green sheet may be squeezed between two rollers, wherein at least one of the rollers is a patterned roller. It is preferable to emboss the green sheet while it contains 10 to 50% of the liquid volatile material.

According to another embodiment a method of making an electrolyte sheet comprises the steps of: (a) providing a green slip on a patterned or embossed carrier with at least 0.5 micrometer surface variations, said slip containing a relatively volatile material; (b) spreading said slip on said patterned carrier to form a textured green sheet having at least one textured surface; (c) at least partially evaporating this material; (d) sintering the textured green sheet to provide an electrolyte sheet with substantially non-porous body, the non porous body having a textured surface with multiple indentations therein, wherein the thickest part of the electrolyte sheet is at least 0.5 micrometers greater than the thinnest part of the electrolyte sheet.

It is preferable that at least one of the rollers is at a temperature of at least 30° C., preferably in the 50° C.-150° C. range and most preferably in the 70° C.-100° C. range.

The preferred electrolyte sheets 10 are formed of a polycrystalline ceramic selected from a group comprising of partially stabilized zirconia or stabilized zirconia, the partially stabilized, or stabilized zirconia, being doped with a dopant selected from the group comprising of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof. The crystalline geometries of zirconia such as tetragonal, monoclinic, and/or cubic and their combinations are all important physical parameters of this structural material. It is most preferable that partially stabilized zirconia is utilized because of its transformational toughening property. The tetragonal phase transforms into monolithic phase under stress and effectively prevents crack formation and propagation. Thus, the electrolyte sheet is more durable, mechanically strong and easier to handle. The more preferable stabilizing dopants are Y, Yb, Ca, Mg, or Sc. Of these dopants Sc, Yb and Y have excellent ionic conductivity. Ceramic sheets can be made tougher by selecting certain toughening agents known to those skilled in this art. Particularly useful and preferred toughening agents are the oxides of tantalum and niobium which can be advantageously added to the above stabilizers.

Volatile Liquid Materials

The volatile liquid material may include a single solvent or a mixture of solvents. Each solvent is characterized by a boiling point and evaporation rate. The evaporation rates are disclosed, for example in the book entitled Organic Solvents, Physical Properties and Methods of Purification, Fourth Edition, John A Riddick, William B. Bunger and Theodore K. Sakano. John Wiley & Sons 1986. The properties of the pure (i.e., unmixed) solvents serves as a guide for their behavior but the actual evaporation rate of mixtures is be governed by the thermodynamics of the mixed systems. Examples of three types of suitable volatile liquid materials are described below.

The liquid volatile material for the green slip may also contain at least one solvent and at least one binder which dissolves in or is dispersed in the solvent. The binder may include, for example, one or more of the following: poly vinyl alcohol, acrylics, poly vinyl butyral, poly ethylene oxide and polyethylene glycols of various molecular weights, polyvinyl pyrrolidone, cellulosics such as hydroxymethylcellulose, hydroxyethylcellulose and hydroxyproplycellulose, gums such as agar gum and gum Arabic, acrylics, vinylacrylics, acrylic acids, polyacrylamides, starches or other combinations and permutations of binders known in the art. Alternately the green slip may contain an emulsion such as an acrylic emulsion with an aqueous liquid (i.e. a liquid that includes water). Alternately, the liquid volatile material of the green slip may contain one or more binder precursors which act to form the binder upon heating, drying or exposure to radiation. Such binder precursors are, for example, acrylics such as poly methyl methacrylate, or condensation polymers, such as polyfunctional acids and glycols. In addition, the liquid volatile material of the green slip may contain a low vapor pressure, high boiling temperature (above 250° C.), plasticizer such as dibutyl phthalate, butyl phenyl phthalate, low molecular weight poly ethylene glycol, or other plasticizers, which act to lower the glass transition temperature (Tg) or improve the plasticity of the particular binder so as to make the green sheet less brittle during handling or subsequent forming. With the use of sufficient plasticizer, the Tg, of the binder system (one or more binder and one or more plasticizer) and the effective Tg of the green sheet may be lowered below the temperature of embossing so as to enable embossing of the green sheet without fracture. In general, increasing the plasticizer content lowers the Tg of the green sheet. However, if the Tg is too low, then the green sheet will be difficult to handle due to low strength or insufficient resistance to deformation from handling. It is common practice in the dielectric industry to use a high ratio of plasticizer to binder so as to enable subsequent lamination and deformation. In the case of green sheet too readily deformable to handle at room temperature, the green sheet typically may remain supported by the carrier film throughout the embossing process.

It is preferred that the green sheet be stiff enough to be self supporting without deformation for handling after release from the carrier. If release takes place before embossing it is preferred that the green sheet be stiff enough to perform embossing without the carrier. This may be achieved by maintaining a transition temperature for the binder of between −50° C. and 100° C., more preferably between −10° C. and 50° C. (The transition temperature is a temperature at which the is a change in the slope of elastic modulus of the material vs. temperature.) This is achieved, for example, in the polyvinyl butyral/dibutyl phthalate binder system by a relatively high ratio of binder to plasticizer, typically greater than 0.5 by weight, more preferably between 1 and 3.5, and more preferably between 1.25 and 2.5. Other ratios may be appropriate for other binder systems. For example, poly butyl methacrylate has a Tg low enough to require little or no plasticizer to obtain a Tg below 30° C. In the polyvinyl butyral/dibutyl phthalate system, a binder to plasticizer ratio of around 2 enables good handling of the green sheet but not embossing below 30° C.

DMS measurement of green sheets made using polyvinylbutyral and dibutyl phthalate binders show a transition temperature between −10° C. and 30° C. The liquid volatile materials also included the following solvents: methanol and 2-methoxy ethanol. Examples are shown in the Table 1, below. These measurement were performed on the green sheet supported by a poly methyl methacrylate fugitive carrier. The transition temperature was seen as a rise in tan δ and is typically very broad, leading to some uncertainty and a range of values in some cases. For a ratio of 1.25 the transition temperature was apparently so broad as to not be observable in this measurement. The fugitive carrier transition was also observed.

TABLE 1

| Sample | Binder (g) | Plasticizer (g) | Ratio (binder/plasticizer) | Zirconia (g) | Ratio (binder/zirconia) | First transition (° C.) |
|---|---|---|---|---|---|---|
| a | 3.50 | 2.80 | 1.25 | 70.15 | 0.05 | Not observed |
| b | 5.05 | 3.37 | 1.50 | 84.17 | 0.06 | 6 |
| c | 4.98 | 2.45 | 2.03 | 82.98 | 0.06 | 15-17 |

The transition temperatures are thought to be due to the inherent binder system softening and the softening of the composite binder/zirconia of the green sheet. For this reason, it is advantageous to heat the green sheet to at least 30° C., and more preferably between 50° C. and 100° C. to enable better embossing. The overall stiffness of the green sheet may be adjusted by adjustment of either the binder/plasticizer ratio or by adjustment of the ration of binder plus plasticizer to ceramic powder (for example, zirconia). In general, raising the ratio of binder-plasticizer to ceramic powder will cause the overall green sheet plasticity to more closely resemble that of the binder-plasticizer alone. A binder/ceramic power ration of between 0.01 and 0.2 is preferred, and more preferred is a ratio of between 0.03 and 0.1. Ratios of 0.05 and 0.06 are shown in Table 1. The binder/power ratio values are chosen to give sufficient strength and plasticity to the green sheet while minimizing its shrinkage on firing.

A lower embossing temperature may also be achieved by the addition of non-volatilized residual liquid of intermediate boiling point. In the latter case it is preferred that a residual amount of solvent remains after the initial drying so that it acts to further plasticize the polymer. This liquid need not be a good solvent for the binder but must serve to sufficiently plasticize it during the embossing step. The amount to which the Tg is lowered is determined by both the binder/plasticizer ratio and by the binder/residual-liquid ratio. Examples of suitable solvents include alcohols, ketones, acetates, ethers, glycols, glycol ethers or solvents with mixed functionality with high boiling points and/or low evaporation rates. This can include 1-butanol, 2-methyl-1-propanol, 2-pentanol, terpineol or other high boiling alcohols. Preferred are the glycols and glycol ethers such as ethylene glycol, propylene glycol, 2-methoxy ethanol, 2-ethoxy ethanol, and other high boiling alcohols. These examples are not meant to limit the possible combinations of polymer, solvent and plasticizer but to illustrate what may be further known to those versed in the art.

Furthermore, a volatile liquid may comprise a low boiling and/or high evaporation rate solvent. For volatile liquids including polyvinyl butyral as a binder, these solvents are, for example, one or more of the following compounds: methanol, ethanol, 1-propanol, 2-propanol, acetone, methyl ethyl ketone, and other solvents having vapor pressures at 25° C. of five or more torr and boiling points below 100° C. Such solvents are advantageous because they speed the drying time of the green sheet, and thus increasing throughput.

In summary, the green slip may contain a binder and optionally a plasticizer or high-boiling solvent, and a low-boiling solvent. By appropriate selection of these materials, the green sheet is has sufficient plasticity to emboss and adequate stiffness for further handling. In one embodiment, a green slip is made using a low temperature boiling solvent (i.e., a solvent with a boiling point below 100° C.), a high temperature boiling solvent (i.e., a solvent with a boiling point above 100° C.), and a plasticizer. After drying the green sheet at below 100° C. the low temperature boiling solvent has been removed, but at least a portion of the high temperature boiling solvent remains along with the plasticizer. The green sheet is then be embossed at a temperature below the deformation temperature Tg of the carrier. After embossing, the green sheet is further dried to remove the remaining high temperature boiling solvent and is released from the carrier by pulling across a sharp support. Upon release the green sheet may be handled without either brittle failure or unwanted deformation. The green sheet is then placed on an alumina setter and fired or sintered to form the final electrolyte sheet.

The preparation of a green 3YSZ based sheet involves some form of casting an appropriate ceramic slip. One such slip is described in the following example.

Preparation of a Ceramic Slip.

A ceramic slip is made containing 100 grams of zirconia powder using the components shown in Table 2, below.

TABLE 2

Components of Slip Batch

| Component | Manufacturer | Form | Function | Batch mass |
|---|---|---|---|---|
| Zirconia TZ-3Y | Tosoh | powder | ceramic | 100.0 g |
| Ethanol | Mallinkrodt | liquid | solvent | 36.36 g |
| 1-Butanol | Fisher | liquid | solvent | 8.79 g |
| Propylene Glycol | Fisher | liquid | solvent | 2.00 g |
| Water (distilled) | | liquid | solvent | 2.50 g |
| Emphos PS-21A | Witco | liquid | dispersant | 1.00 g |

All ingredient bottles are kept tightly closed until used to reduce water pickup. A 250 ml Nalgene® polyethylene plastic container is cleaned by rinsing twice with about 10-20 ml of ethanol or methanol. The container is then placed in a 70° C. drying oven to evaporate the alcohol. After drying, the container and lid are weighed. The zirconia powder is weighed out in a weighing boat and set aside. The ethanol is pipetted into the dried Nalgene container. The 1-butanol is then pipetted into the plastic container. Subsequently, propylene glycol is pipetted into the container. Finally, the water and, then, the Emphos PS-21A are pipetted into the container. About 450 grams of 10 mm Tosoh TZP-3Y milling media is weighed out and the weight recorded. The media is then added to the container and the container is gently shaken. The zirconia powder is then added from the weighing boat. The lid is replaced onto the container and tightened. The closed container is re-weighed and the total weight of solvents, powder, and dispersant is calculated. The slip is then subjected to vibratory milling for 72 hours, after which the viscosity of the slip is measured.

Two settling steps are performed in order to remove the coarse grains and narrow the grain size distribution in the slip.

A double settling technique provided a good grain size distribution with acceptable material losses.

A second 125 ml Nalgene® plastic container and lid are washed and dried as above. The second container and lid is weighed and the weight recorded. The slip from the milling container is poured into the second container, leaving the milling media in the original container. The slip and second container with lid is then weighed. The coarse grains are allowed to settle out of the slip for 72 hours. A third container and lid are washed, dried, weighed, and the weight recorded. Carefully, the unsettled slip is pipetted into the third container, being careful not to pick up any of the settled sediment. The pipetted slip with the third container with lid are weighed. This slip is then allowed to settle for an additional 24 hours. The residue/sediment in the second container is dried in a ventilated oven at about 90° C. for at least three hours and the dried residue and container plus lid are weighed.

A fourth 125 ml plastic container and lid are washed and dried as above. The weight of this fourth lid and container is then recorded. Again, the slip from the third (24 hour settling) container is pipetted into the fourth container, being careful not to pick up any of the settled residue with the pipette. The fourth container and slip are weighed and the weight recorded. The reside is dried in the third container, as above, and then weighed. From the recorded weights, it can be determined how much ceramic powder is left in the fourth container.

A weak flocculating agent, glacial acetic acid, a plasticizer, and a binder are added to the ceramic powder present in the remaining slip. The components used for flocculation and binding, reported in weight percent in excess of the weight of the remaining ceramic powder, are shown in Table 3, as follows:

TABLE 3

Components Used For Flocculation and For Binder System

| Component | Manufacturer | Form | Function | Batch mass |
| --- | --- | --- | --- | --- |
| Glacial Acetic Acid | Malinckrodt | liquid | flocculant | 1 wt % of remaining ceramic powder |
| Isopropyl alcohol | Fisher | liquid | acid dilution | 1 wt % |
| Dibutyl-Pthalate | Aldrich | liquid | plasticizer | 3.5 wt % |
| Polyvinyl Butyral | Monsanto | powder | binder | 6 wt % |

A 50/50 wt % solution of glacial acetic acid in isopropyl alcohol is made. 2 wt % (in excess of the weight of the remaining ceramic powder) of this solution is pipetted into the slip in the fourth container. The lid is replaced and the container is gently shaken. Next, 3.5 wt % (in excess of the weight of the remaining ceramic powder) of dibutyl-phthalate is pipetted into the slip in the fourth container. The lid is replaced and the container is gently shaken. Using a weighing boat, 6 wt % (of the remaining ceramic powder) of polyvinyl butyral is weighed out and poured into the slip. The lid is replaced and the container is gently shaken. This container is then placed on a paint shaker type of device for at least 15 minutes to fully dissolve the binder. Two clean zirconia milling media are put into the container and the container is placed on a roller mill at low speed for three days.

The use of a polymer (polymethyl methacrylate) base layer in the tape casting procedures is advantageous because it makes the thin green material easier to handle. To provide such a layer, a fugitive polymer solution was prepared in a polyethylene bottle by dissolving 40 parts by weight polymethyl methacrylate in 60 parts of ethyl acetate. The solution was placed on a roller mill to mix. The acrylic polymer solution thus provided was then cast onto a substrate carrier using a doctor blade to form thin acrylic sheet. The polymer-coated substrate carrier was then placed in a 60° to 70° C. drying oven for 30 to 60 minutes.

It is noted that at sufficient temperatures (e.g., about 600° C. and above), zirconia based thin electrolyte sheets exhibit good ionic conductance (smaller than 0.001 S/cm) and very low electronic conductance (less than $1 \times 10^{-6}$ S/cm) It is noted that electrolyte ionic conductivity increases with higher operating temperatures, but the choice of stable materials used (for example, metals useful for manifolding) becomes increasingly limited since inexpensive metal alloys will oxidize above about 850° C. Therefore, it is preferable that fuel cells which include electrolyte sheets of the present invention operate between 600° C. and 850° C.

EXAMPLES

The invention will be further clarified by the following examples.

Example 1

Figure 11A:
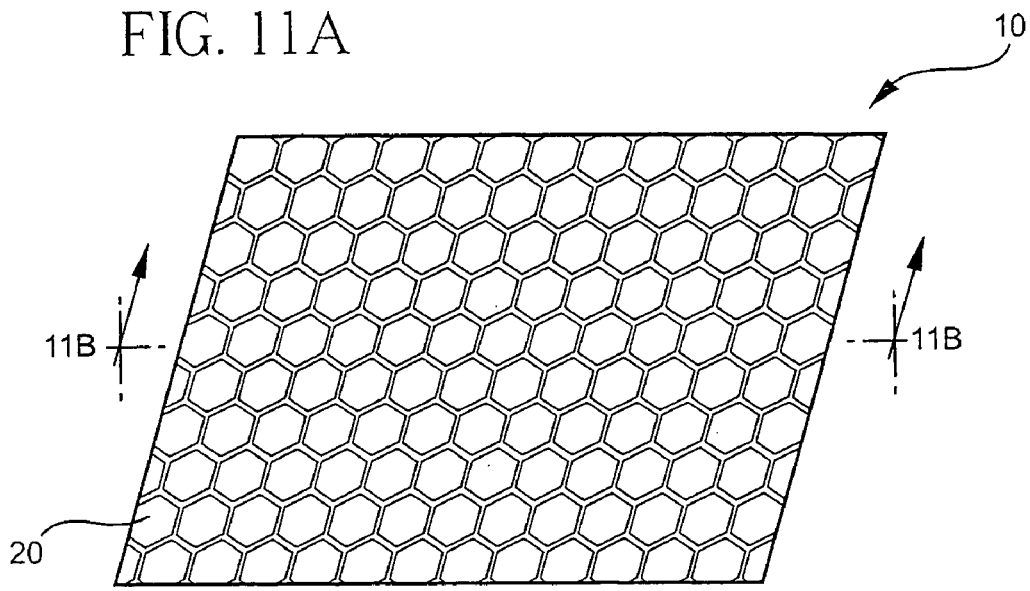
FIG. 11A illustrates one example of the electrolyte sheet of the present invention.
Figure 11B:
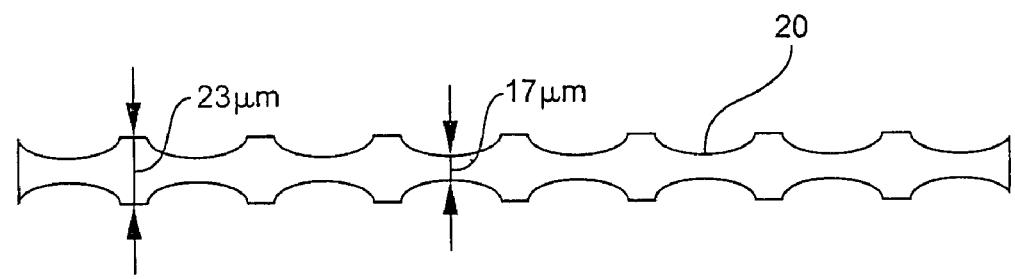
FIG. 11B illustrates the cross-sectional view of the electrolyte sheet of FIG. 11A.

FIG. 11A illustrates one example of the electrolyte sheet of the present invention. FIG. 11B illustrates the cross-sectional view of the electrolyte sheet of FIG. 11A. The electrolyte sheet 10 of this example has two textured surfaces 20, 22. This electrolyte sheet was made as follows:

i. In a filtered air "clean" environment, Teflon® coated cloth (150 micron-Ultra Premium Grade PTFE coated fiberglass fabric, available from CS Hyde Co., Lake Villa Ill., USA) is smoothed out on a glass plate and then attached to the glass plate with tape. The Teflon® coated cloth has an existing micro texture (weave).

ii. A slip of zirconia-3 mole % yttria powder is coated on the Teflon® coated cloth using a tape casting "doctor" blade with a 50 micron gap and a 15 cm width, forming a green sheet.

iii. The micro-textured green sheet (i.e. the green sheet with the size of features 25 between 0.5 and 50 microns) was dried for ½ hour at room temperature under a plastic cover that encased the drying green sheet, with about a 2 mm gap along the width of the ceramic sheet but no gap along the long edges.

iv. The micro-textured green sheet was then dried in an oven at 60° C. for 1 hour.

v. Finally, the micro-textured green ceramic sheet was sintered at 1430° C. for 2 hours.

After sintering the micro-texturing (periodic variations in thickness) of the electrolyte sheet 10 was observed via SEM (Scanning Electron Microscope). The SEM observation showed that the maximum thickness of the micro textured sheet was about 23 micrometers and the thickness of the thin areas was about 17 micrometers. The sintered electrolyte sheet 10 has a very textured side 20 and a less textured side 22, corresponding to the bottom of the casting and the top surface of the casting respectively. The sintered electrolyte sheet 10 is free standing—i.e., it can be handled without requiring additional support.

The invention will be further clarified by the following examples.

An anode ink was screen printed on the textured side of the sintered electrolyte sheet of this example, and a cathode was printed on the opposing side. During drying at 150° C. for 30 minutes the ink remain well adhered to either side of the micro-textured electrolyte sheet and its adherence is better than its adherence to non-textured electrolyte sheet of the same thickness.

Figure 12:
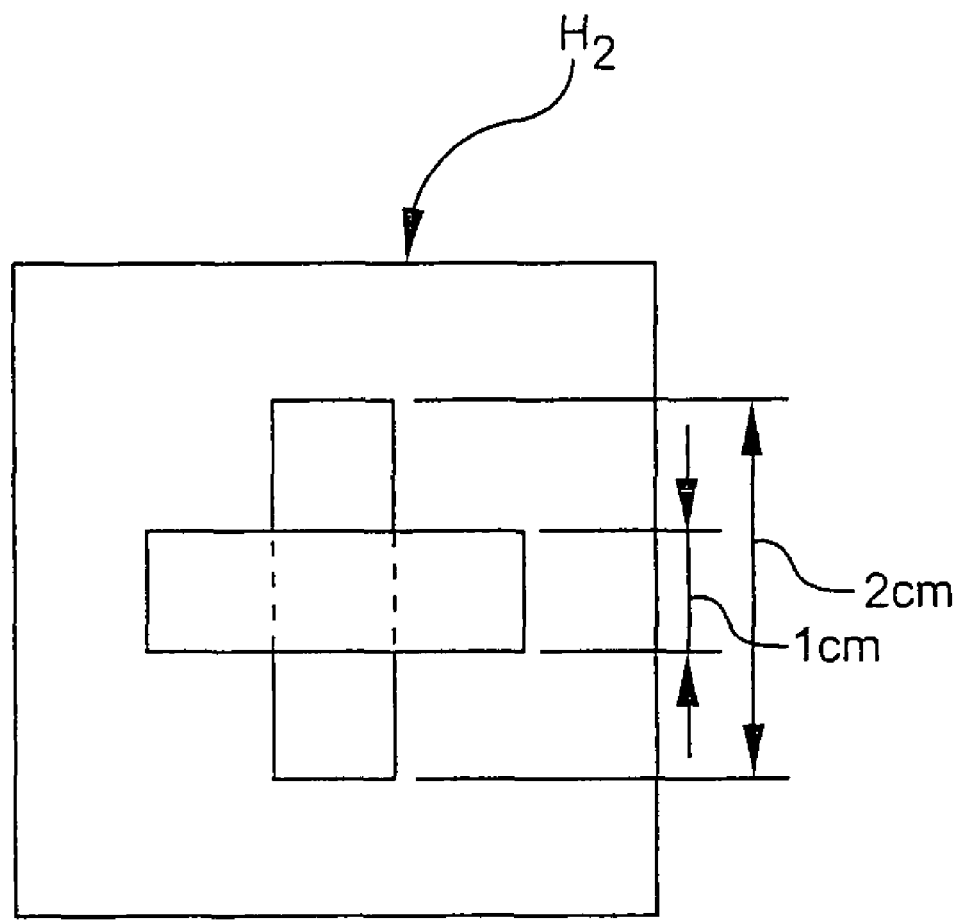
FIG. 12 illustrates schematically a crossed single cell that utilizes an electrolyte sheet of FIGS. 11A and 11B.

FIG. 12 schematically illustrates a crossed single cell. The electrodes were screen printed on a micro-textured zirconia-3 mole % yttria electrolyte sheet 10 illustrated in FIGS. 11A and 11B. More specifically, the crossed cell includes two crossed electrodes, each electrode being 2 cm long by 1 cm wide, resulting in effective cross sectional area of 1 cm². The electrodes were printed and fired on the micro-textured 3YSZ electrolyte sheet in successive operations. First an anode layer comprising a mixture of 3YSZ and nickel oxide was printed and fired at 1350° C. for 1 hour. Next a cathode comprising a mixture of 3YSZ and lanthanum strontium manganate (LSM) was printed and fired at 1200° C. for 1 hour. Next, a silver 10% palladium alloy mixed with dysprosium bismuthate cathode current collector was printed on the cathode side and a silver 10% palladium alloy mixed with 3YSZ anode current collector was printed on the anode side. The current collectors were co fired at 850° C. for 1 hour. The resultant single crossed cell was tested in a simple "packet" configuration illustrated in FIG. 12. Forming gas (6% $H_2$-balance $N_2$) was provided to the interior chamber through a gas feed tube; air is supplied to the packet exterior. When tested at 725° C. this cell provided power density of 0.39 W/cm². In comparison, a similar cell was fabricated with identical electrodes, with a similar electrolyte sheet cast as above, but on a flat Teflon® surface. The resultant flat, untextured electrolyte sheet was uniformly 20 micrometers thick. The cell with the flat, untextured electrolyte sheet reached a maximum 0.32 W/cm² under similar test conditions. Therefore, electrolyte surface texturing improved electrolyte cell performance by nearly 25%, when 6% $H_2$, balance $N_2$ forming gas mixture was utilized.

Example 2

Applicants also discovered that it is desirable to modulate the electrolyte thickness in a patterned fashion in order to improve its net mechanical properties. First consider the case of an electrolyte of uniform thickness. If the space between electrode strips (i.e., via galleries 55) has less printed material (to accommodate vias and/or via pads) the via gallery will be comparatively less "stiff" then the electrode regions. On flexure of the device, the via gallery regions will be subject to stress concentration because they are relatively more flexible than the electrode regions and will have a relatively short radius of curvature. In this case, because we wish to avoid concentrating stress in the regions between the electrodes which contain the vias (i.e., through holes), a more uniform flexure is desired throughout the electrolyte sheet. Therefore, it will be advantageous to provide more thickness in the via gallery regions, which will provide more uniform flexure of the electrolyte sheet.

Figure 13A:
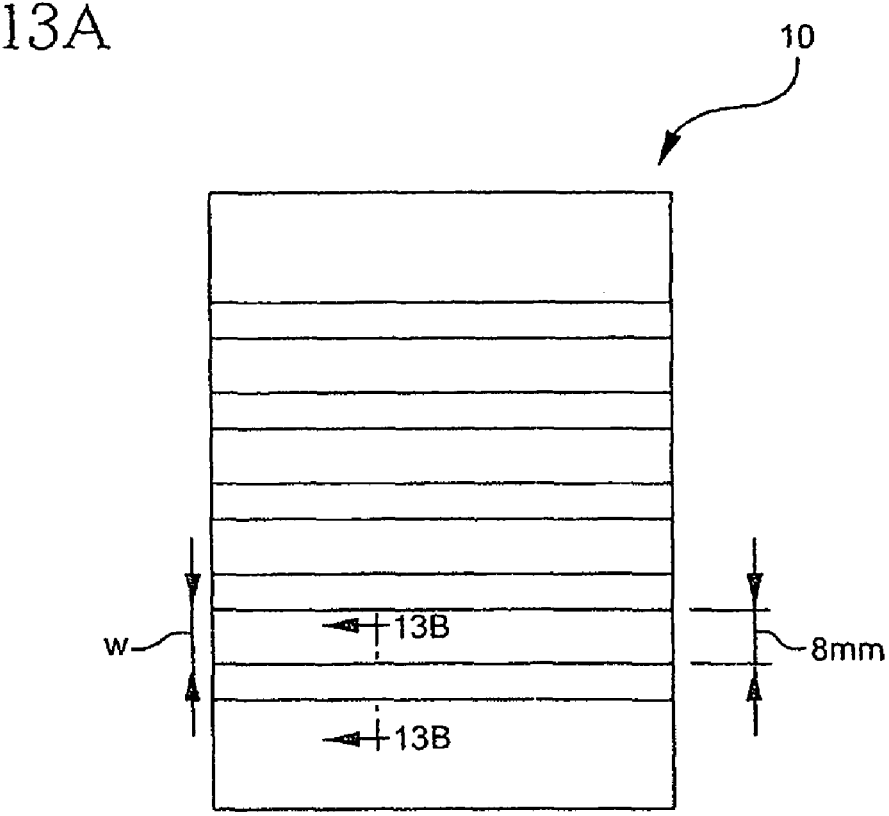
FIG. 13A illustrates an exemplary electrolyte sheet with thickness variations for control of mechanical flexure.
Figure 13B:
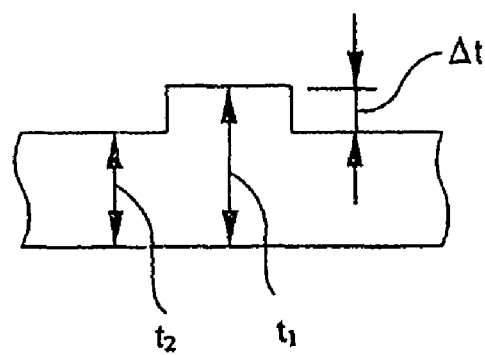
FIG. 13B illustrates a cross-section of the portion of the electrolyte sheet of FIG. 13A.

FIG. 13A illustrates an electrolyte sheet with thickness variations for control of mechanical flexure. FIG. 13B illustrates a cross-section of the portion of this electrolyte sheet. Thicker regions $t_1$ of the electrolyte sheet will become the via galleries of the finished device and are separated by a distance of 10 mm. The thin regions $t_2$ will be printed with the electrode layers. To achieve the desired device flexural properties, it is preferable that the thickness of the electrolyte sheet corresponding to via galleries be 15 micrometers to 60 micrometers and, preferably, 15 to 45 micrometers thick and even more preferably 18 to 25 micrometers thick. For example, the thicker regions may be 60 micrometers thick while the thinner regions may be 20 micrometers thick, which results in $\Delta t$ of 40 micrometers.

Example 3

Figure 14:
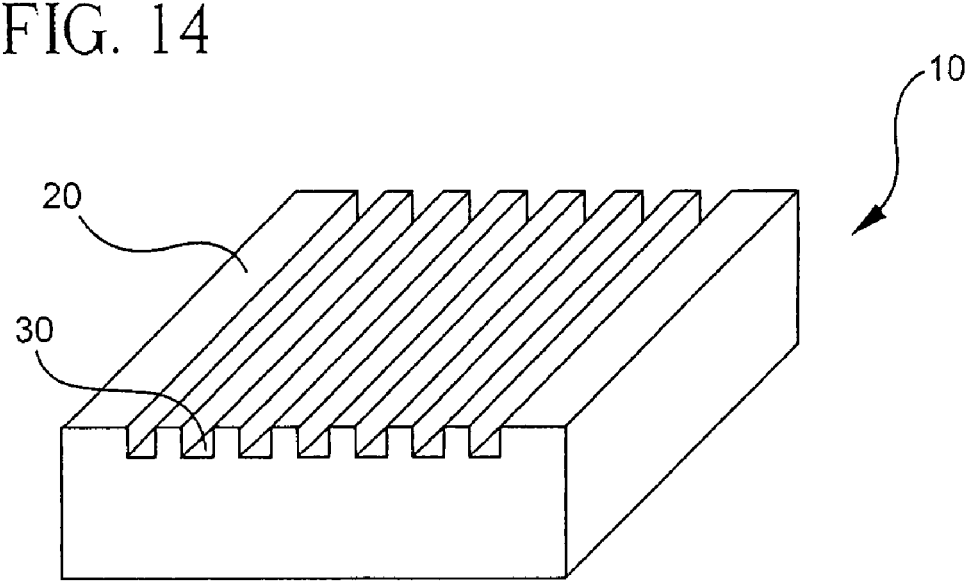
FIG. 14 illustrates schematically another example of electrolyte sheet with thickness variations.

FIG. 14 illustrates another example of the electrolyte sheet 10 with a textured surface 20. Surface 20 includes a plurality of linear indentations or grooves. These features are 3 micrometers wide and 3 micrometers deep and separated by 3 micrometers. The non-grooved portions of the electrolyte sheet 10 are 15 micrometers thick. The grooves reduce the average electrolyte thickness by 1.5 micrometers (10%) and increase the surface area by a factor of 2 (100%) in the textured region.

A similar plurality of grooves with 1 micron separations, vertical walls, 1 micrometer wide and 6 micrometers deep will have an aspect ratio of 6:1 and thus reduce the average electrolyte sheet thickness by 3.5 micrometers (20%) while increasing the surface area by a factor of seven.

As another variation of this example, an array of grooves 3 micrometers wide and 5 micrometers deep with wall angles of 70 degrees reduces the thickness of the electrolyte sheet by 2.5 micrometer (about 17% of a 15 micrometer nominal thickness) and increases the surface area by a factor of 2.34.

Figure 15:
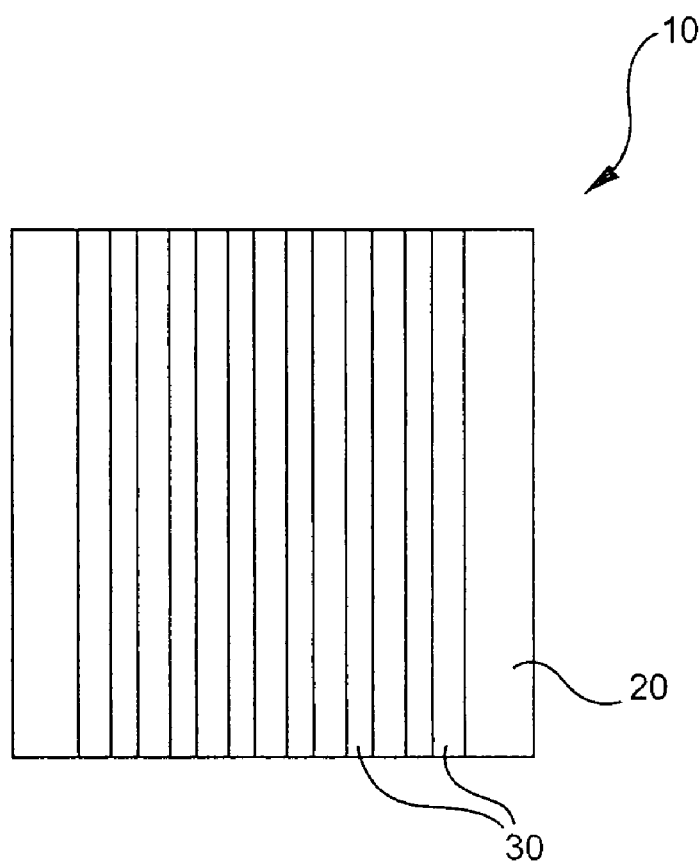
FIG. 15 illustrates a top view of yet another exemplary electrolyte sheet, as seen under a microscope.

FIG. 15 shows a top view of similarly patterned electrolyte sheet as seen under a microscope. The pattern includes 3 micrometer wide channels with depths of 3 micrometers, separations of 3 micrometers, and 70 degree wall angles. These features reduce the thickness of the electrolyte sheet by 1.5 micrometer (about 10% of a 15 micrometer nominal thickness) and increase the surface area by a factor of 1.70.

It is preferable the surface area features increase the electrolyte surface area by a factor of 1.1 to more than 20. The preferable aspect ratio of these surface features falls in the range of 0.1:1 to 10:1.

Example 4

Figure 16A:
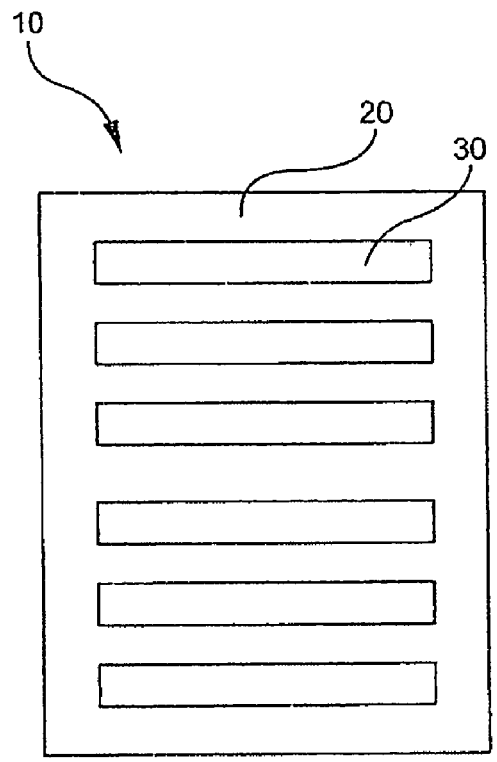
FIGS. 16A and 16B illustrate schematically two more examples of a textured electrolyte sheet with a textured surface.
Figure 16B:
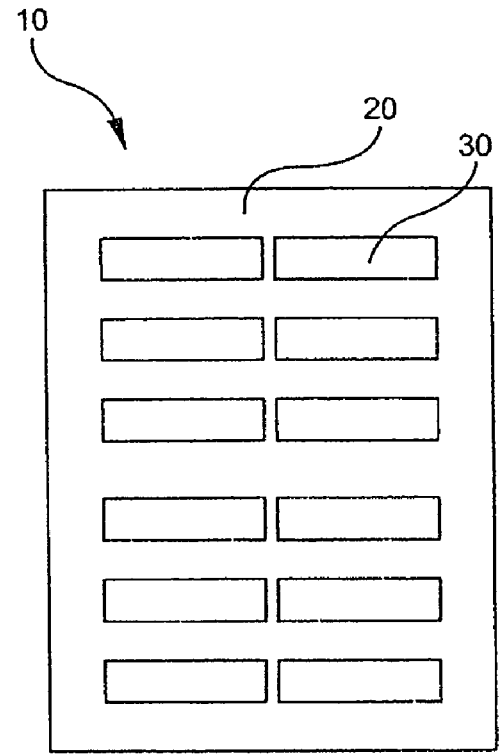
Figure 16C:
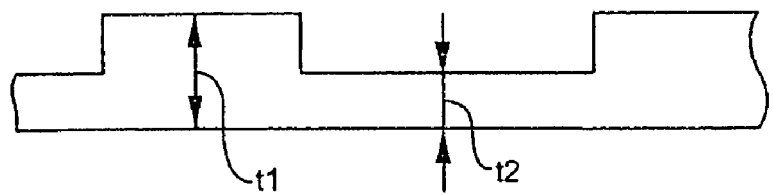
FIG. 16C illustrates a cross-section of a region of the textured electrolyte sheets illustrated in FIGS. 16A and 16B.

A 75 micron thick Mylar® substrate carrier was coated with a thin, less than 1 micrometer layer of methyl cellulose as a release agent and dried at 65° C. for more than ½ hour. An acrylic layer was then cast with a 12.5 micron or 25 micrometer clearance doctor blade over the methyl cellulose layer and dried at 65° C. for more than ½ hour. Using a sharp blade (such as Exacto knife or a razor blade), a pattern similar to that depicted in FIG. 16A was made in the acrylic layer. The areas on the pattern that corresponds to the thick areas in the final electrolyte sheet were the areas on the Mylar® substrate where the acrylic layer were carefully pealed off. A second layer of methocel was applied to the patterned acrylic and the substrate carrier and was also dried. Using a 12.5-micrometer or a 25-micrometer gap tape casting doctor blade, a ceramic slip was cast over the patterned acrylic on the substrate carrier to form a green sheet. After the green layer had dried, a second acrylic layer (overcoat) was cast over the green sheet. After the overcoat dried, the green sheet with the acrylic overcoat was removed from the Mylar® substrate carrier. (The second acrylic layer is applied to provide backing to the green sheet in order to enable it to be separated (pulled off) from the methocel layer.) The green sheet with thin and thick portions was sintered in air at 1430° C. for 2 hours resulting in a dense, flexible ceramic sheet 10 with thick and thin areas. The surface profile of this ceramic sheet was measured via SEM and surface profilimoter and we observed that the thin areas were several to ten micrometers thinner than the thicker areas. An electrolyte sheet pattern similar to that of FIG. 16B may also be utilized.

Example 5

In a filtered air "clean" environment, Scotch® tape was placed on a flat glass substrate. The tape segments were about 25 micron thick. A 25 micrometer thick Teflon® substrate carrier was placed upon the glass substrate and the tape segments and the Teflon® was smoothed to avoid wrinkles. Using a 50 micron gap tape casting "doctor" blade, a 40 inch×6 inch sheet of ceramic/polymer (zirconia,-3 mole % yttria powder) was cast upon the Teflon® substrate carrier. The ceramic layer was dried for ½ hour at room temperature under a plastic cover with about a 2-mm gap along the 6-inch edges of the ceramic sheet but no gap along the long edges. Second, it was dried in an oven at 60 degrees C. for 1 hr. The acrylic layer of the above described composition was cast on top of the ceramic after drying using a 7 inch width, 25 micrometer gap blade. After the acrylic was dried at room temperature for ½ hour then 60° C. for 1 hour, the green ceramic with acrylic overcoat were removed from the Teflon® carrier. The green ceramic sheet with thin and thicker areas was sintered at 1430° C. for 2 hours. After sintering the thin and thick layers were easily observed by the amount of transparency in the sintered sheet. SEM observation gave the thickness of the thick areas as 26 microns and the thickness of the thin areas as 15 microns.

Example 6

An electrolyte sheet, when utilized in a fuel cell, will typically be operated with much higher flow of gas (air or oxygen), compared to fuel flow. This is done to supply sufficient oxygen from the air to the fuel cell assembly. The airflow may create a greater pressure and stress in middle region of the electrolyte sheet. More specifically, an electrolyte sheet will experience a predominately compressive force on the high pressure side (for example, air side) and a predominately tensile force on the other (for example, fuel side). Applicant's found that if the electrolyte sheet has one textured and one relatively smooth surface, it is preferable for the electrolyte sheet to be oriented in a manner such that the textured surface experiences predominately compressive forces. Thus, it is preferable that the patterned side of the electrolyte sheet faces the air (or oxygen). The surface features (such as small surface defects and/or protruding features of the textured surface, when subjected to predominately tensile forces may result in stress concentration and tearing around these features. Therefore, it is preferable that the relatively smooth side of the electrolyte sheet, rather than the more textured side, experiences the predominately tensile forces. Thus, it is preferable that the relatively smooth surface of the electrolyte sheet faces the fuel side of the fuel cell device. In addition, because cathode act as relatively poor catalysts, as compared to anodes, the cathode facing side of the electrolyte sheet will benefit more from the increased surface area then the anode facing side of the electrolyte sheet. Furthermore, the cathode facing side of the electrolyte sheet is also the air (oxygen) facing side. A relatively smooth surface or side or the electrolyte sheet is the side or surface of the electrolyte sheet with finer surface features than the more textured surface or side. For example the smooth side may have 1 micron tall features while the more textured side may have 10 micron features. Alternatively, the smooth side of the electrolyte may not be textured.

Therefore, texturing of the electrolyte sheet can result in a thinner electrolyte sheet and thus reduced ohmic resistance and higher efficiency, while orienting the electrolyte sheet with a more textured surface facing the air (oxygen) and the less textured surface facing the fuel, results in better mechanical durability.

Figure 17A:
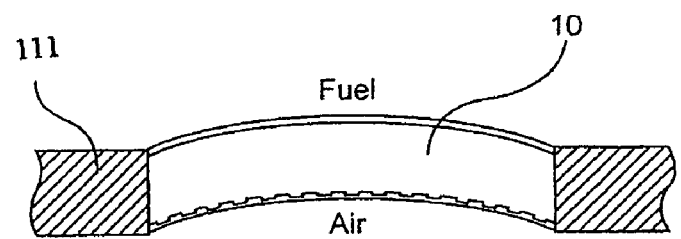
FIG. 17A is a schematic illustration of an electrolyte sheet mounted in a frame and situated between air and fuel.
Figure 17B:
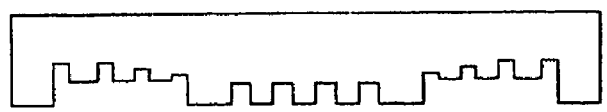
FIG. 17B illustrates schematically a cross-section a textured electrolyte sheet that has relatively thick central region.

If the electrolyte sheet is held in a frame 111, it may experience buckling, as shown schematically in FIG. 17A. An embodiment of the textured electrolyte sheet that is especially suited to operate in such environment is illustrated schematically on FIG. 17B. As other electrolyte sheets examples disclosed above, this electrolyte sheet includes thicker and thinner areas. However, in the electrolyte sheet of this embodiment, the thinner areas become progressively thinner closer to the edges. That is, because some regions of the electrolyte sheet (such as the center, for example) experience higher stresses when pressurized, it is advantageous that these regions of the electrolyte sheet have larger average thickness than the regions experiencing less stress.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of making solid oxide electrolyte sheet, said method comprising the steps of:
   (a) providing a green slip on a carrier, said slip containing a volatile material to form a green electrolyte sheet having (i) transition temperature Tg, wherein $-10°$ C.$<$Tg$<$30° C., and (ii) an average thickness of less than 100 microns;
   (b) at least partially evaporating said volatile material;
   (c) embossing said green electrolyte sheet with at least 0.5 micrometer variations in its thickness thereby providing textured green sheet;
   (d) sintering the textured green sheet to provide an electrolyte sheet with substantially non-porous body, the non porous body having a textured surface with multiple indentations therein, wherein the thickest part of the electrolyte sheet is 0.5 to 6 micrometers greater than the thinnest part of the electrolyte sheet said indentations have depth to width ratio between 1:1 and 6:1, and the electrolyte sheet has an average thickness of less than 100 microns.

2. The method of claim 1, wherein said embossing step is performed while said green electrolyte sheet contains at least 10 to 50% of said volatile material, and said volatile material comprises:
   (i) at least one binder, or binder precursor capable of forming a binder; and
   (ii) at least one plasticizer;
   such that the ratio of binder to plasticizer by weight is 1 to 3.5.

3. The method of claim 1, wherein said step of embossing said green electrolyte sheet includes texturing said green electrolyte sheet with at least one textured roller while heating said green electrolyte sheet to a temperature of at least 30° C.

4. The method of claim 1, wherein said green electrolyte sheet is squeezed between two rollers, wherein at least one of said rollers is a patterned roller.

5. The method of claim 1, wherein said method includes the step of providing (i) a carrier roller; and (ii) another roller, and wherein a carrier that is supporting the green electrolyte sheet is situated between said carrier roller and said another roller.

6. The method of claim 5 wherein said another roller is the green electrolyte sheet take up roller.

7. The method of claim 5 wherein said another roller is the carrier sheet take up roller.

8. The method of claim 5, wherein said step of embossing said green electrolyte sheet includes texturing said green electrolyte sheet with at least one textured roller.

9. The method of claim 1, wherein said textured green sheet is bent between two rollers, thereby providing corrugated textured green electrolyte sheet, and the average thickness of said electrolyte sheet is less than 100 microns.

10. A method of making a sintered electrolyte sheet, said method comprising the steps of:
(a) providing a green slip on a patterned polymer carrier with at least 0.5 micrometer surface variations, said slip containing a volatile material, said volatile material comprising:
  (i) at least one binder, or at least one binder precursor capable of forming a binder; and
  (ii) at least one plasticizer;
  such that the ratio of binder to plasticizer by weight is 1 to 3.5;
(b) spreading said slip on said patterned polymer carrier to form a corresponding textured surface on green electrolyte sheet, thereby forming textured green electrolyte sheet having at least one textured surface, said textured green electrolyte sheet having an average thickness of less than 100 microns;
(c) at least partially evaporating said material from the said textured green electrolyte sheet;
(d) sintering the textured green electrolyte sheet to provide a sintered electrolyte sheet with substantially non-porous body, the non porous body having a textured surface with multiple indentations therein, wherein the thickest part of the sintered electrolyte sheet is at least 0.5 micrometers greater than the thinnest part of the sintered electrolyte sheet and the average thickness of said electrolyte sheet is less than 100 microns.

11. The method of claim 10, further comprising contacting said textured green electrolyte sheet with a patterned roller so as to produce a green sheet that has two textured surfaces.

12. The method of claim 11, further including the step of heating said roller.

13. The method of claim 10, further including the step of feeding said textured green electrolyte sheet is between two rollers, thereby providing corrugated textured green electrolyte sheet.

14. The method of claim 13, further including the step of heating said two rollers.

15. The method of claim 10, further including the step of forming said patterned carrier is by embossing.

16. The method of claim 10, wherein said method includes the step of providing: (i) a carrier roller; and (ii) another roller, and wherein a patterned polymer carrier that is supporting the green electrolyte sheet is situated between said carrier roller and said another roller.

17. The method of claim 10, wherein said at least one binder is selected from the group consisting of: polyvinyl alcohol, acrylics, polyvinyl butyral, polyethylene oxide, polyethylene glycols, polyvinyl pyrrolidone, cellulosic, gums, acrylic, vinylacrylic, acrylic acid, polyacrylamide, and starch.

18. The method of claim 10, wherein said at least one binder precursor is selected from the group consisting of: acrylic, polyfunctional acid, and glycols and combinations thereof.

19. The method of claim 10, wherein said plasticizer is selected from a group consisting of: dibutyl phthalate, butyl phenyl phthalate, poly ethylene glycol, and combinations thereof.

20. The method of claim 10, wherein said volatile material includes a solvent, and wherein said solvent is selected from the group consisting of: alcohol, ketone, acetate, ether, glycol, glycol ether, methyl-1-propanol, 2-pentanol, terpineol, ethanol, butanol, propylene glycol, water, a combination of solvents including at least one solvent with a boiling point below 100° C. and at least one solvent having a boiling point above 100° C., methanol, 2-methxy ethanol, 1-propanol, 2-propanol, acetone, metyl ethyl ketone, solvents having vapour pressure at 25° C. of at least 5 torr and boiling point below 100° C., and combinations thereof.

21. The method of claim 10, wherein said green electrolyte sheet includes a ceramic powder and a binder, and wherein the ratio of the binder to the ceramic power is 0.01 to 0.2.

22. A method of making an electrolyte sheet, said method comprising the steps of:
(a) providing a green slip on a patterned polymer carrier, said slip containing a volatile material, said volatile material comprising:
  (i) at least one binder, or at least one binder precursor capable of forming a binder; and
  (ii) at least one plasticizer;
  such that the ratio of binder to plasticizer by weight is 1 to 3.5;
(b) spreading said slip on said patterned polymer carrier to form a green electrolyte sheet having thickness variations and an average thickness of less than 100 microns;
(c) at least partially evaporating said material;
(d) sintering the green electrolyte sheet to provide an electrolyte sheet with (i) substantially non-porous body and the average thickness of is less than 100 microns and (ii) indentations or grooves such that the thickest part of the electrolyte sheet is 0.5 to 6 micrometers greater than the thinnest part of the electrolyte sheet and the indentations or grooves have depth to width ratio between 1:1 and 6:1.

* * * * *